US012763638B2

(12) United States Patent
Yang et al.

(10) Patent No.: US 12,763,638 B2
(45) Date of Patent: Oct. 13, 2026

(54) DENSE ASSEMBLY MOTOR

(71) Applicant: TRICORE CORPORATION, Taichung City (TW)

(72) Inventors: Ching-Sing Yang, Taichung City (TW); Ting-Yi Koo, Taichung City (TW); Chia-Ting Wang, Taichung City (TW); Cheng-Fang Yu, Taichung City (TW)

(73) Assignee: TRICORE CORPORATION, Taichung City (TW)

( * ) Notice: Subject to any disclaimer, the term of this patent is extended or adjusted under 35 U.S.C. 154(b) by 211 days.

(21) Appl. No.: 18/675,662

(22) Filed: May 28, 2024

(65) Prior Publication Data

US 2025/0293567 A1 Sep. 18, 2025

(30) Foreign Application Priority Data

Mar. 15, 2024 (TW) ................................ 113109661

(51) Int. Cl.
*H02K 5/22* (2006.01)
*H02K 5/02* (2006.01)

(52) U.S. Cl.
CPC ............... *H02K 5/225* (2013.01); *H02K 5/02* (2013.01)

(58) Field of Classification Search
CPC ............. H02K 5/225; H02K 5/02; H02K 5/04
USPC ........................................................... 310/89
See application file for complete search history.

(56) References Cited

U.S. PATENT DOCUMENTS

| | | | | |
|---|---|---|---|---|
| 4,873,464 A * | 10/1989 | Wang | H01R 39/39 | |
| | | | 310/239 | |
| 2015/0207368 A1* | 7/2015 | Chen | H02K 11/21 | |
| | | | 310/83 | |
| 2022/0311301 A1* | 9/2022 | Ishikawa | H02K 3/28 | |
| 2023/0148272 A1* | 5/2023 | Hirabayashi | H02K 5/225 | |
| | | | 310/71 | |

* cited by examiner

*Primary Examiner* — Ahmed Elnakib
(74) *Attorney, Agent, or Firm* — Muncy, Geissler, Olds & Lowe, P.C.

(57) ABSTRACT

A dense assembly motor includes a motor casing serving as a protective structure. The interior of the motor casing is divided into a first accommodation space and a second accommodation space. The first accommodation space is used for accommodating a motor. The motor includes a motor shell, and the motor shell is a hollow cylindrical body with two open ends made of a magnetic material. Inside the motor shell resides a cylindrical magnet, and a coil winding is located between the motor shell and the magnet. The coil winding length exceeds the magnet length. The second accommodation space is designed for passing a wire through it. The first accommodation space and the second accommodation space are connected to each other.

10 Claims, 6 Drawing Sheets

DENSE ASSEMBLY MOTOR

FIELD OF INVENTION

A type of motor.

BACKGROUND OF THE PRESENT INVENTION

As the motor produced by the prior art is gradually miniaturized in volume, it is finding wide application, especially in equipment requiring high precision and compact dimensions. This motor not only conserves the internal volume of such equipment, but also increases the internal space available for use. Moreover, due to the generally light nature of the motor, it is particularly suitable for applications where light weight is required, such as in handheld equipment.

Because of the volume limitation, it also directly limits the output power of the motor, i.e., the motor cannot generate similar or the same output power as other large motors.

For example, referring to FIGS. 4 to 6 for schematic diagrams of the motor produced by the prior art, which is often used to drive vehicles, electric vehicles, and remote-controlled vehicles. In designing the product specification, it is often necessary to simultaneously satisfy two characteristics, i.e., sufficient power (speed or torque) and sufficient compact volume, which is actually difficult to achieve at the same time. For the above-mentioned dense assembly motor, it is usually selected to densely mount a commercially available motor product with a size-conforming and iron-shelled characteristic in a casing A. Since the casing must accommodate not only the motor product but also other components such as control circuits, batteries, reducers, etc., while also satisfying the application-end size constraints, the performance of the above-mentioned existing motor product is therefore limited.

SUMMARY OF THE PRESENT INVENTION

In view of the technical problem disclosed above that both the size and the motor output performance of existing products are difficult to achieve, the present invention further provides a dense assembly motor, comprising: a motor casing serving as a protective structure, the interior of the motor casing being divided into a first accommodation space and a second accommodation space; the first accommodation space being used for accommodating a motor, the motor comprising: a motor shell having two open ends, being made of a magnetic material, and being in the shape of a hollow cylindrical body; a magnet in the shape of a cylinder disposed within the motor shell and having a magnet length; a coil winding located between the motor shell and the magnet and having a coil winding length greater than the magnet length; and the second accommodation space being used for passing a wire therethrough; wherein the motor casing and the motor shell are made of different materials, and the first accommodation space and the second accommodation space are connected to each other.

Wherein, the wire is connected to the motor accommodated in the first accommodation space through the second accommodation space.

Wherein, the material of the motor casing includes plastic.

Wherein, the material of the motor shell includes aluminum and steel.

Wherein, the motor casing is directly fixed to the motor shell.

Wherein, the motor casing is fixed to the motor shell by pressing and/or bonding.

Wherein, the material of the motor casing includes aluminum and steel.

The dense assembly motor in accordance with the present invention is facilitated in manufacturing, which can save manufacturing time and labor, retain the original volume and internal components of the conventional motor, and increase the magnet length of the magnet and the coil winding length of the coil winding by simply removing the motor cover of the conventional motor to achieve the purpose of improving the operating performance of the dense assembly motor. At the same time, by assembling the motor casing and the motor shell with different materials, the structural strength and operating performance of the dense assembly motor can be enhanced, allowing the dense assembly motor to maximize its operating effect and extend its service life, and to be suitable for various working conditions.

DETAILED DESCRIPTION OF THE PREFERRED EMBODIMENTS

The present invention aims to provide a dense assembly motor that retains the appearance and volume of a conventional motor while being able to increase the volume of a conventional magnet mounted inside the conventional motor. The dense assembly motor not only retains the advantages of the conventional motor, but also optimizes the internal structure of the conventional motor such that the volume of the magnet inside the hollow motor can be increased compared to the volume of the conventional magnet, thereby providing the dense assembly motor with higher operating efficiency.

In order to more fully describe the difference between the dense assembly motor in accordance with the present invention and the conventional motor so that those having relevant knowledge and skill can readily understand the dense assembly motor in accordance with the present invention, the detailed description of the present invention is given below.

Figure 1:
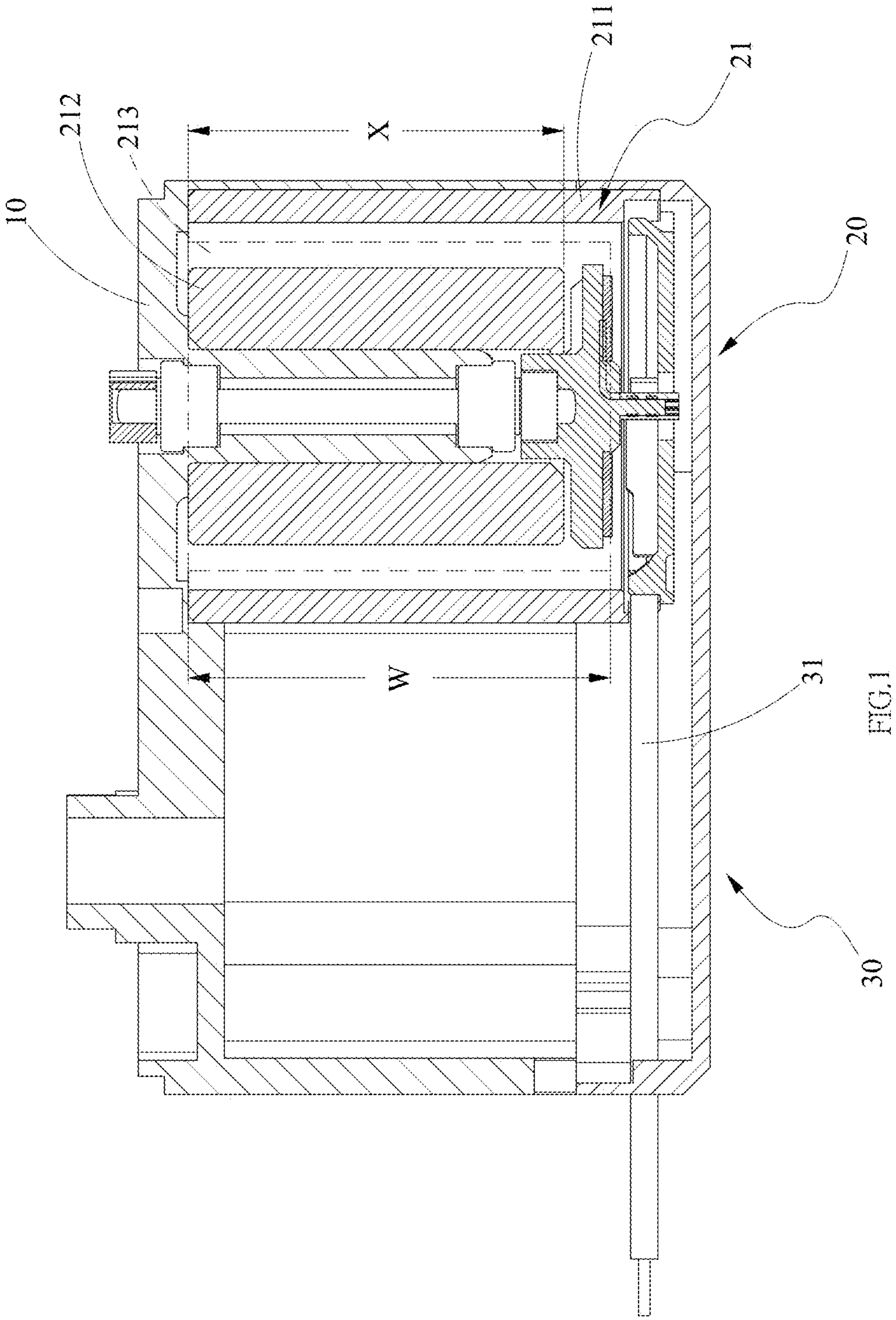
FIG. 1 is a sectional view of a first preferred embodiment of the present invention.

Referring to FIG. 1, which is a first preferred embodiment of the dense assembly motor in accordance with the present invention. The dense assembly motor comprises a motor casing 10, a first accommodation space 20, and a second accommodation space 30. The motor casing 10 has an external appearance of a rectangular shell. In this embodiment, the dense assembly motor is divided into the first accommodation space 20 and the second accommodation space 30 within the motor casing 10, and the first accommodation space 20 and the second accommodation space 30 are adjacent and connected to each other. The first accommodation space 20 is used for accommodating a motor 21, while the second accommodation space 30 is used for accommodating a wire 31 or components such as a control module, a power source (not shown), a transmission structure, etc.

Figure 2:
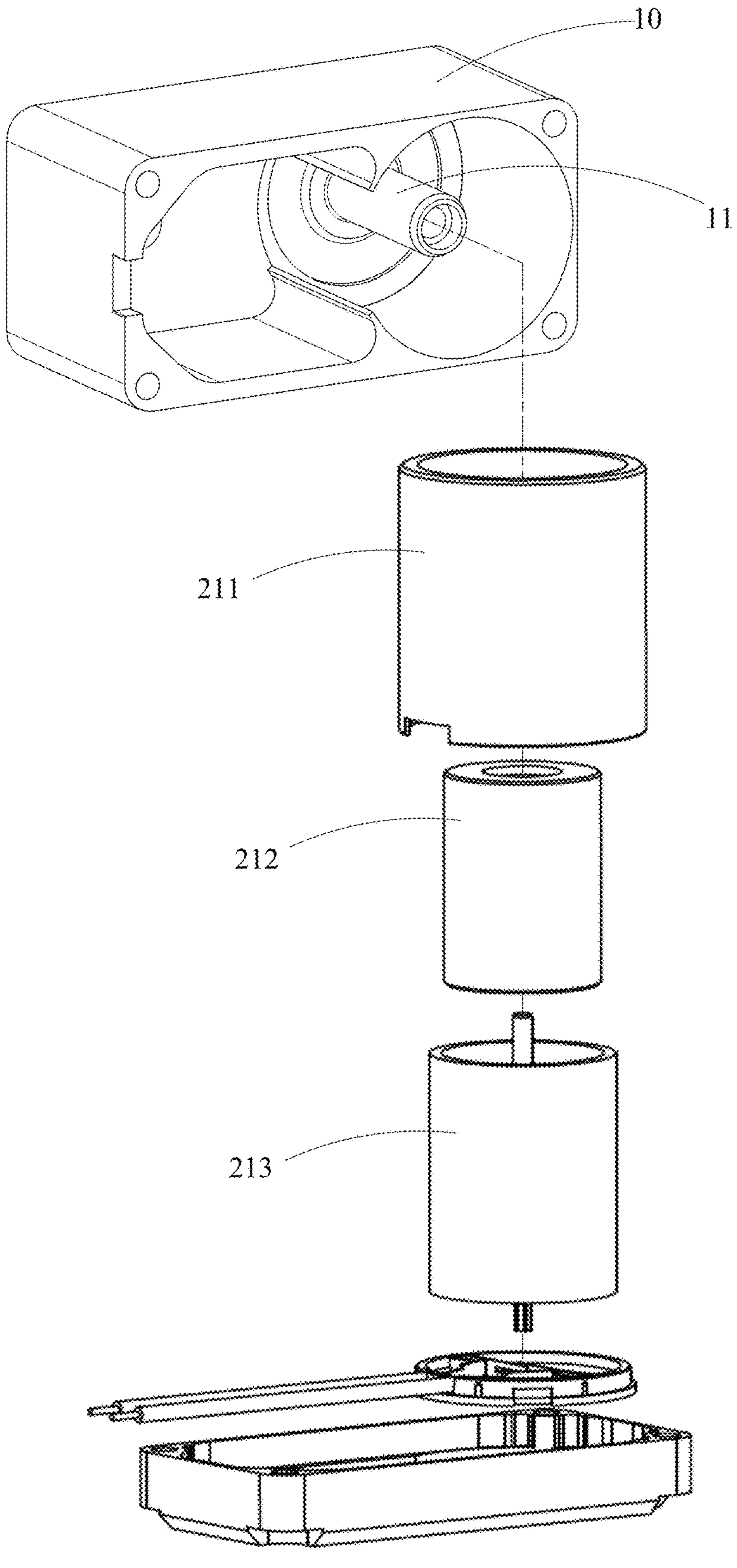
FIG. 2 is an exploded view of a second preferred embodiment of the present invention.

Referring to FIGS. 1 and 2. The motor casing 10 extends a fixing column 11 corresponding to the first accommodation space 20. In this embodiment, the fixing column 11 is a hollow cylindrical column protruding from the inner surface of the first accommodation space 20 and formed integrally with the motor casing 10. At least a part of the fixing column 11 is fixed to the motor 21. In this embodiment, a part of the motor 21 is fitted onto the fixing column 11 to secure the motor 21 within the motor casing 10. Based on the design of the fixing column 11, the stability of the motor 21 during rotation can be significantly increased. For example, in this embodiment, a rotating shaft is illustrated as being inserted and fixed into the fixing column 11, allowing the dense assembly motor to rotate. Since the rotating shaft is held by the fixing column 11, when the rotating shaft starts to rotate and drives the entire dense assembly motor to rotate, the fixing column 11 holds the rotating shaft, thereby reducing the wobble generated during the rotation of the rotating shaft, allowing the dense assembly motor to rotate stably, and reducing the wear of the dense assembly motor.

The wire 31 is connected to the motor 21 accommodated in the first accommodation space 20 at one end through the second accommodation space 30, and the other end of the wire 31 passes out of the motor casing 10, where a current flows from the wire 31 to the motor 21 to cause the motor 21 to rotate.

The motor 21 is composed of a motor shell 211, multiple magnets 212, and corresponding coil windings 213 arranged for the magnets. The motor shell 211 is a hollow cylindrical body having two open ends, which encloses and accommodates the magnets 212 and the coil windings 213 inside. The motor shell 211 is used for enabling the magnetic field generated by the multiple magnets 212 to be enclosed within the motor shell 211, thereby effectively preventing the magnetic field generated by the motor 21 from being lost and increasing the rotational efficiency of the motor 21.

Preferably, one end of each of the multiple magnets 212 is positioned correspondingly with the motor shell 211 and is flush with or slightly protrude from one of the open ends of the motor shell 211. The magnet length X of the magnet 212 may even be equal to or slightly greater than the length of the motor shell 211, which can accommodate axial movement, allowing the dense assembly motor to adjust its operating efficiency according to application requirements, thereby improving the practicality of the dense assembly motor. From this, it can be seen that since the motor shell 211 has two open ends, the arrangement space and movement space of the magnet are not limited, thereby solving the design dilemma and limitation of the prior art and achieving the technical effect of significantly increasing the magnet size and simplifying the mechanical design.

In this embodiment, the manufacturing materials of the motor casing 10 and the motor shell 211 of the dense assembly motor can be different. For example, the motor casing 10 can be made of plastic or other materials that are easy to manufacture complex structures with precise dimensions and have little or no effect on the magnetic field generated by the magnet 212, thereby reducing the interference of the base material inside the dense assembly motor on the magnetic field, which helps maintain the accuracy and efficiency of the dense assembly motor. Alternatively, the motor casing 10 can be made of aluminum or other relatively high-strength materials depending on the strength requirements. The motor shell 211 can be made of magnetic materials, steel, or other high-strength rigid materials capable of concentrating the magnetic field so that the overall structure of the dense assembly motor has sufficient strength and ensures the stability of the dense assembly motor. By combining the motor casing 10 and the motor shell 211 with different materials, both the structural strength and the operating performance of the dense assembly motor are taken into account, so that the dense assembly motor can maximize its operating effect and extend its service life, and be suitable for various working conditions.

The motor casing 10 can be made of plastic or other materials that have little or no effect on the magnetic field generated by the magnet 212. The motor shell 211 can be made of aluminum, steel, or other high-strength, rigid materials. Any combination of different materials for the motor casing 10 or the motor shell 211, and/or the structure or method by which the motor casing 10 and the motor shell 211 achieve the effects mentioned in this specification are within the scope of this specification.

The magnet 212 is used to generate magnetic field. Preferably, the magnet 212 is mounted inside the motor shell 211 of the motor 21. When the current flows from the wire 31 to the motor 21, the current passes through the coil windings 213 installed inside the motor 21, and the coil windings 213 generate a magnetic field that interacts with the magnetic field generated by the magnet 212 to cause rotational induction.

The coil winding 213 is preferably formed by winding three or more coils, and the coil winding 213 is located between the motor shell 211 and the magnet 212. The coil winding 213 is used to generate the magnetic field and interacts with the magnet 212 to generate rotational induction. The rotational induction between the coil winding 213 and the magnet 212 can be achieved by the current flowing from the wire 31 to the motor 21 and the current flowing through the coil winding 213 installed inside the motor 21 to generate the magnetic field, which interacts with the magnetic field generated by the magnet 212, thereby causing the motor 21 to start rotating.

To better understand the internal components of this embodiment, the multiple coil windings 213 are indicated by dotted lines in FIG. 1, showing internal components such as the multiple magnets 212, so that those of skill in the art may follow this specification for operation.

Since the motor shell 211 has the open-ended structure, it ensures that the coil winding 213 has sufficient heat dissipation room during operation, which prevents the coil winding 213 from overheating, thereby improving the operating efficiency and service life of the dense assembly motor.

Since the dense assembly motor of the present invention is derived from the conventional motor of the prior art, the overall structure of the conventional motor is similar to that of the dense assembly motor proposed herein. As a result, this specification omits an elaborate description of the internal structure of the conventional motor and instead focuses on describing only the essential components so that this specification can be more concise and clearer.

It is worth mentioning that the dense assembly motor of the present invention is formed by removing the motor cover A mentioned in the prior art of this specification to form the open-ended motor shell 211, which allows the magnet length X of the magnet 212 to be significantly increased by 5% to 60% compared to the magnet length Y of the conventional motor, and the coil winding length W of the coil winding 213 to be significantly increased by 5% to 60% compared to the coil winding length Z of the conventional motor; this design of omitting the motor cover A not only allows the magnet 212 and the coil winding 213 to be significantly increased in length and volume, but more preferably, since the lengths and volumes of the magnet 212 and the coil winding 213 are larger than those of the conventional motor, the larger magnet 212 and the coil winding 213 can provide a larger magnetic field, thereby increasing the efficiency of the motor. At the same time, the dense assembly motor retains the motor shell 211, which enables the magnetic field to be completely enclosed within the motor shell 211 of the dense assembly motor, thereby effectively improving the operating performance of the dense assembly motor by reducing the influence on the magnetic field.

Preferably, the magnet length X of the dense assembly motor is increased by about 60% compared to the magnet length Y of the conventional motor.

Preferably, the coil winding length W of the dense assembly motor is increased by about 64% compared to the coil winding length Z of the conventional motor.

More preferably, the coil winding length W is greater than or equal to the magnet length X.

Figure 3:
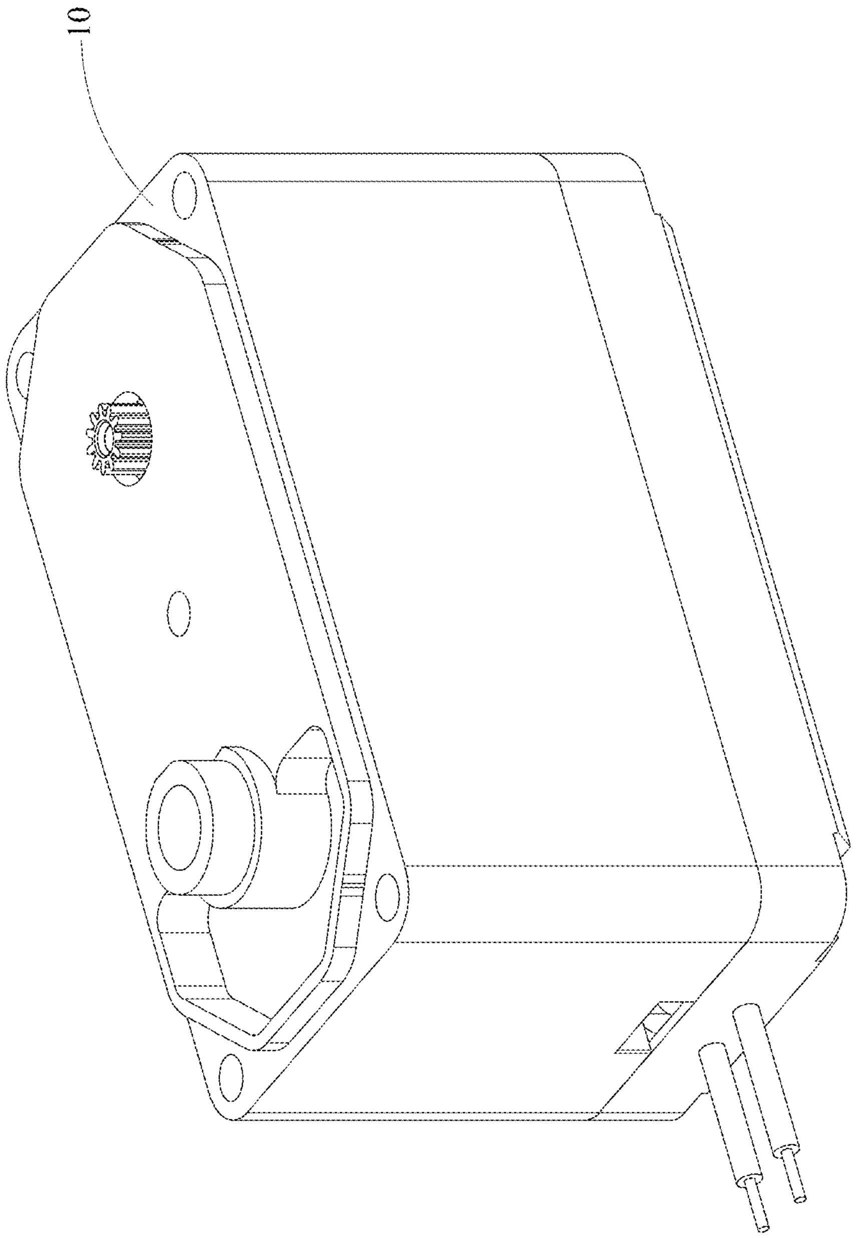
FIG. 3 is a perspective view of a third preferred embodiment of the present invention.
Figure 4:
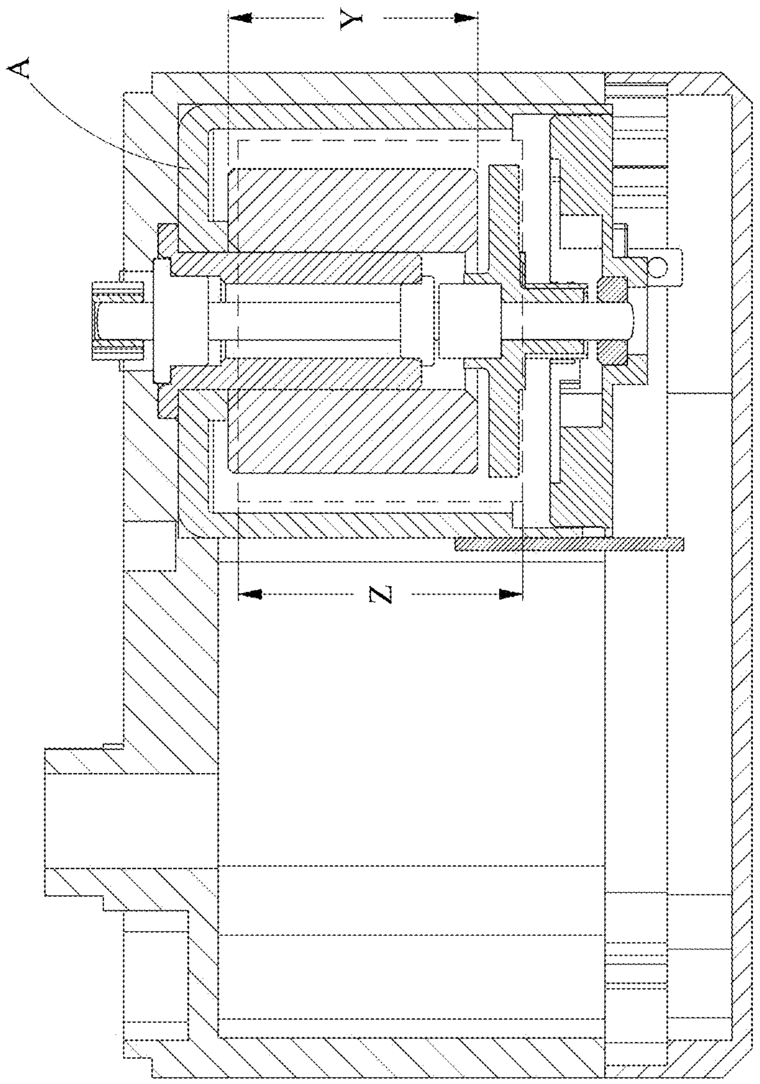
FIG. 4 is a sectional view of a first embodiment of the prior art of the present invention.
Figure 5:
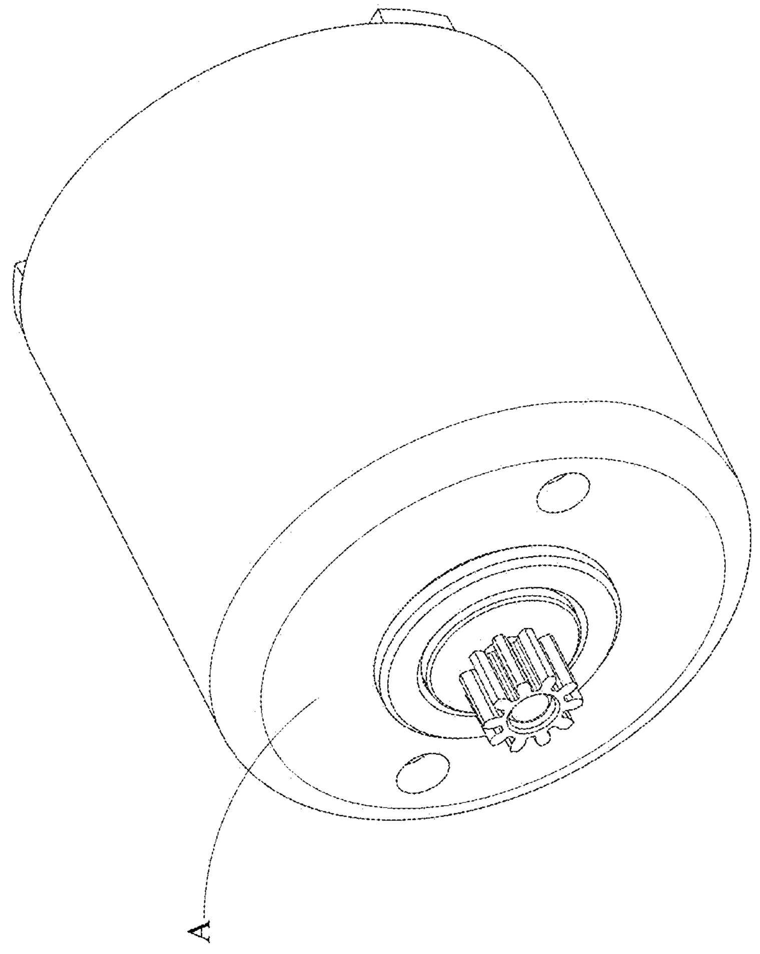
FIG. 5 is a perspective view of a second embodiment of the prior art of the present invention.
Figure 6:
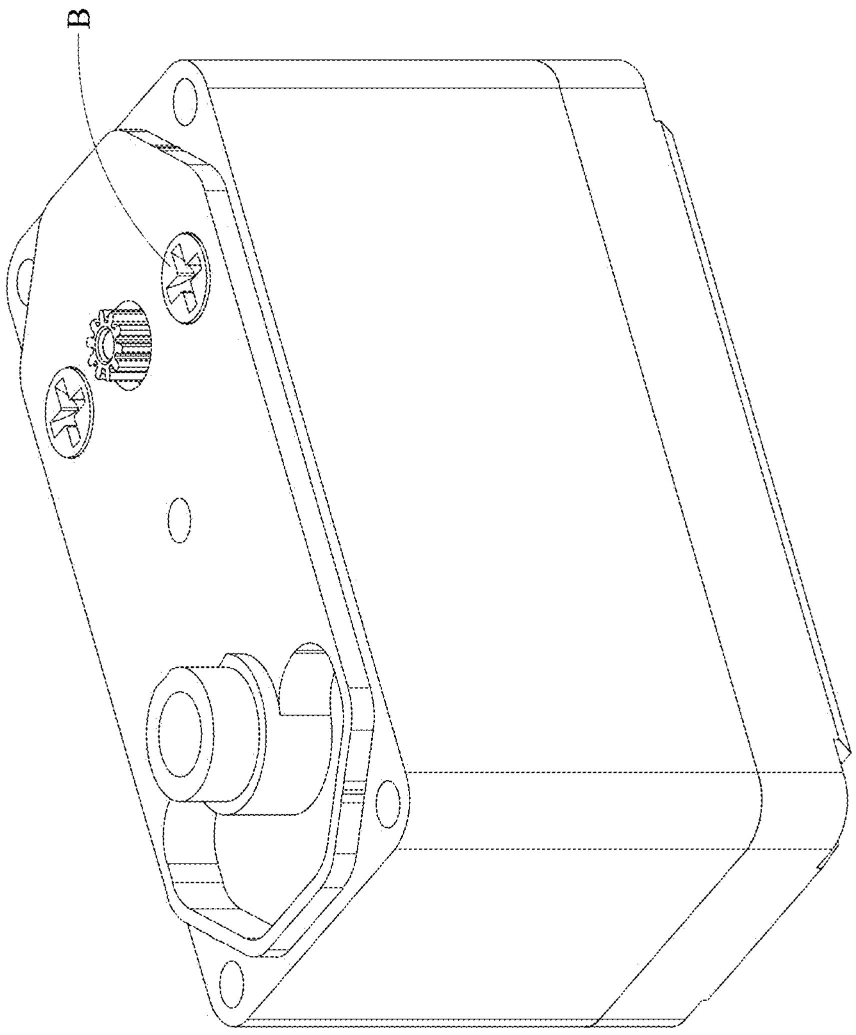
FIG. 6 is a perspective view of a third embodiment of the prior art of the present invention.

FIG. 3 is a third preferred embodiment of the dense assembly motor in accordance with the present invention. The dense assembly motor in accordance with the present invention has a simple and integral structure, which saves the time and labor costs required for assembling the conventional motor with a locking structure B and the motor cover A. At the same time, it can also reduce the errors generated during the assembly of the motor cover A and the locking structure B, thereby improving the positioning accuracy of the dense assembly motor.

Preferably, the dense assembly motor is fixed by the motor casing 10 directly to the motor shell 211; more preferably, the dense assembly motor is fixed by pressing or bonding the motor shell 211 to the motor casing 10, thereby significantly optimizing the assembly time of the dense assembly motor, while also saving some materials required for the dense assembly motor and reducing the assembly cost.

In short, the dense assembly motor in accordance with the present invention is easy to manufacture, which can save manufacturing time and labor, retain the original volume and internal components of the conventional motor, and increase the magnet length X of the magnet 212 and the coil winding length W of the coil winding 213 by simply removing the motor cover A of the conventional motor to achieve the purpose of improving the operating performance of the dense assembly motor. At the same time, by assembling the motor casing 10 and the motor shell 211 with different materials, the structural strength and operating performance of the dense assembly motor can be enhanced, allowing the dense assembly motor to maximize its operating effect and extend its service life, and to be suitable for various working conditions. Furthermore, since the motor shell 211 in this embodiment has the open-ended structure, the heat energy accumulated by the coil winding 213 during operation can be more easily dissipated, thereby achieving an unexpected effect of providing the entire product with better service life and efficiency. Due to the open-ended structure of the motor shell 211, the magnet 212 and the coil winding 213 can have the maximum expansion space, which allows the entire motor product to have an optimal speed and torque output.

What is claimed is:

1. A dense assembly motor, comprising:

a motor casing serving as a protective structure, and the interior of the motor casing being divided into a first accommodation space and a second accommodation space; wherein, the first accommodation space is used for accommodating a motor, and the motor comprises: a motor shell, wherein the motor shell is a hollow cylindrical body comprising two open ends and the motor shell is made of a magnetic material, and an interior of the motor shell is defined as an accommodation space; a magnet, wherein the magnet is cylindrical in shape and is disposed within the motor shell, and the magnet has a magnet length; and a coil winding, wherein the coil winding is located between the motor shell and the magnet, and the coil winding has a coil winding length greater than the magnet length; and the second accommodation space is used for passing a wire therethrough;

wherein the motor casing and the motor shell are made of different materials, and the first accommodation space and the second accommodation space are connected to each other.

2. The dense assembly motor according to claim 1, wherein the motor casing extends a fixing column corresponding to the first accommodation space, and the fixing column is a hollow cylindrical column and the fixing column is formed integrally with the motor casing, and at least a part of the fixing column is fixed to the motor.

3. The dense assembly motor according to claim 1, wherein the magnet length is equal to or greater than the length of the motor shell.

4. The dense assembly motor according to claim 3, wherein the motor casing is directly fixed to the motor shell.

5. The dense assembly motor according to claim 1, wherein the wire is connected to the motor accommodated in the first accommodation space through the second accommodation space.

6. The dense assembly motor according to claim 5, wherein the motor casing is directly fixed to the motor shell.

7. The dense assembly motor according to claim 1, wherein the material of the motor casing comprises plastic.

8. The dense assembly motor according to claim 7, wherein the motor casing is fixed to the motor shell by pressing and/or bonding.

9. The dense assembly motor according to claim 1, wherein the material of the motor shell comprises aluminum and steel.

10. The dense assembly motor according to claim 1, wherein the material of the motor casing comprises aluminum and steel.

* * * * *